US006743545B2

(12) United States Patent
Huang

(10) Patent No.: US 6,743,545 B2
(45) Date of Patent: Jun. 1, 2004

(54) CLOSED TYPE BATTERY CASE

(76) Inventor: Yu-Huei Huang, 3F, No. 142, Li-De Street, Chungho City, Taipei Hsien (TW)

( * ) Notice: Subject to any disclaimer, the term of this patent is extended or adjusted under 35 U.S.C. 154(b) by 162 days.

(21) Appl. No.: 09/934,532

(22) Filed: Aug. 23, 2001

(65) Prior Publication Data
US 2003/0027042 A1 Feb. 6, 2003

(30) Foreign Application Priority Data
Jul. 31, 2001 (TW) .................................... 842042781 U

(51) Int. Cl.[7] ................................................ H01M 2/06
(52) U.S. Cl. ......................... 429/96; 429/98; 429/100
(58) Field of Search ............................ 429/96, 97, 98, 429/99, 100

(56) References Cited
U.S. PATENT DOCUMENTS
5,296,315 A * 3/1994 Rein ........................... 429/100
5,537,022 A * 7/1996 Huang ........................ 320/107

OTHER PUBLICATIONS
Johnson, "SJ Battery Extender", Mar. 2000, http://www.pocketpcpassion.com/General/BatteryExtenderBy SJ/BatteryExtenderSJ.htm.*

* cited by examiner

Primary Examiner—Carol Chaney
(74) Attorney, Agent, or Firm—Troxell Law Office PLLC

(57) ABSTRACT

A closed type battery case having a lower base, an upper lid, and a battery plate device. The upper lid is slidably connected to the lower base. At least a separator is disposed in the lower base parallel to the lateral walls. The battery plate device has at least a positive-negative plate, a negative plate and a positive plate being attached to the separator and the lower base so as to be located in place in accordance with the principle of series circuit. A base chamber is formed between a front wall of the lower base and the battery plate device and provided with a chamber hole. An output terminal is connect with the positive-negative plate of the battery plate device and received in the base chamber, and an input end of an electronic produce is connected to the output terminal through the chamber hole for the power supply.

16 Claims, 3 Drawing Sheets

CLOSED TYPE BATTERY CASE

BACKGROUND OF THE INVENTION

1. Field of the Invention

The present invention relates to a closed type battery case, and particularly to closed type battery case, which can offer the power supply temporarily in case of urgency.

2. Description of Related Art

The U.S. Pat. No. 5,537,022, which is owned by the present inventor, has disclosed an enclosed battery holder and the enclosed battery holder comprises a seat engaging with a cover and a conductive plate means is received in the space enclosed therein. The seat near a lateral side thereof has two opposite grooved supports for locating a first conductive plate and near the other lateral side thereof has further grooved supports for locating a second and a third conductive plates respectively. Both of the lateral walls and the front wall on the seat provide a rib respectively and the cover at both lateral sides thereof also has a rib respectively corresponding to that on the seat so that the cover can slide on the seat as soon as the cover engages with the seat. Further, the front wall provides a hole for the lead wires extending outward through the hole. It is characterized in that the seat provides partitions to avoid the conductive plates contacting each other, the front wall extends a hook piece and the rear wall provides an engaging hole, the respective rib on the cover with an extended rib section to enclose the rib on the seat, and the cover further provides a slot corresponding to the hook piece on the seat and a hook piece corresponding to the engaging hole on the seat such that the seat and the cover can engage with each other firmly.

The preceding hole at the front wall on the seat is essentially for the two lead wires extending outward to supply the power source to the electronic product so that the enclosed battery holder mostly is thought as an accessory for the electronic product. However, the portable consumptive personal electronic product such as the mobile phone or the personal digital assistant (PDA) is so popular that the electronic product may become useless in case of the power in the battery (mostly the configuration and the specification thereof are special) equipped in the electronic product having been out and no place being available for recharging. Hence, how to utilize the conventional standardized battery associated with a battery box with a function of being able to recharge the electronic product temporarily is a bottleneck worth us to overcome.

SUMMARY OF THE INVENTION

An object of the present invention is to provide a closed type battery case, which has a base chamber is disposed in a lower base next to a battery plate device with a chamber hole at a proper place therein, an output terminal is in conjunction with the battery plate device and received in the base chamber to connect with an input end of an electronic product through the chamber hole for the power supply such that the closed type battery case can perform a function for temporarily recharging the electronic product.

BRIEF DESCRIPTION OF THE DRAWINGS

The present invention can be more fully understood by referencing to the following detailed description and accompanying drawings, in which.

DETAILED DESCRIPTION OF THE PREFERRED EMBODIMENTS

Figure 1:
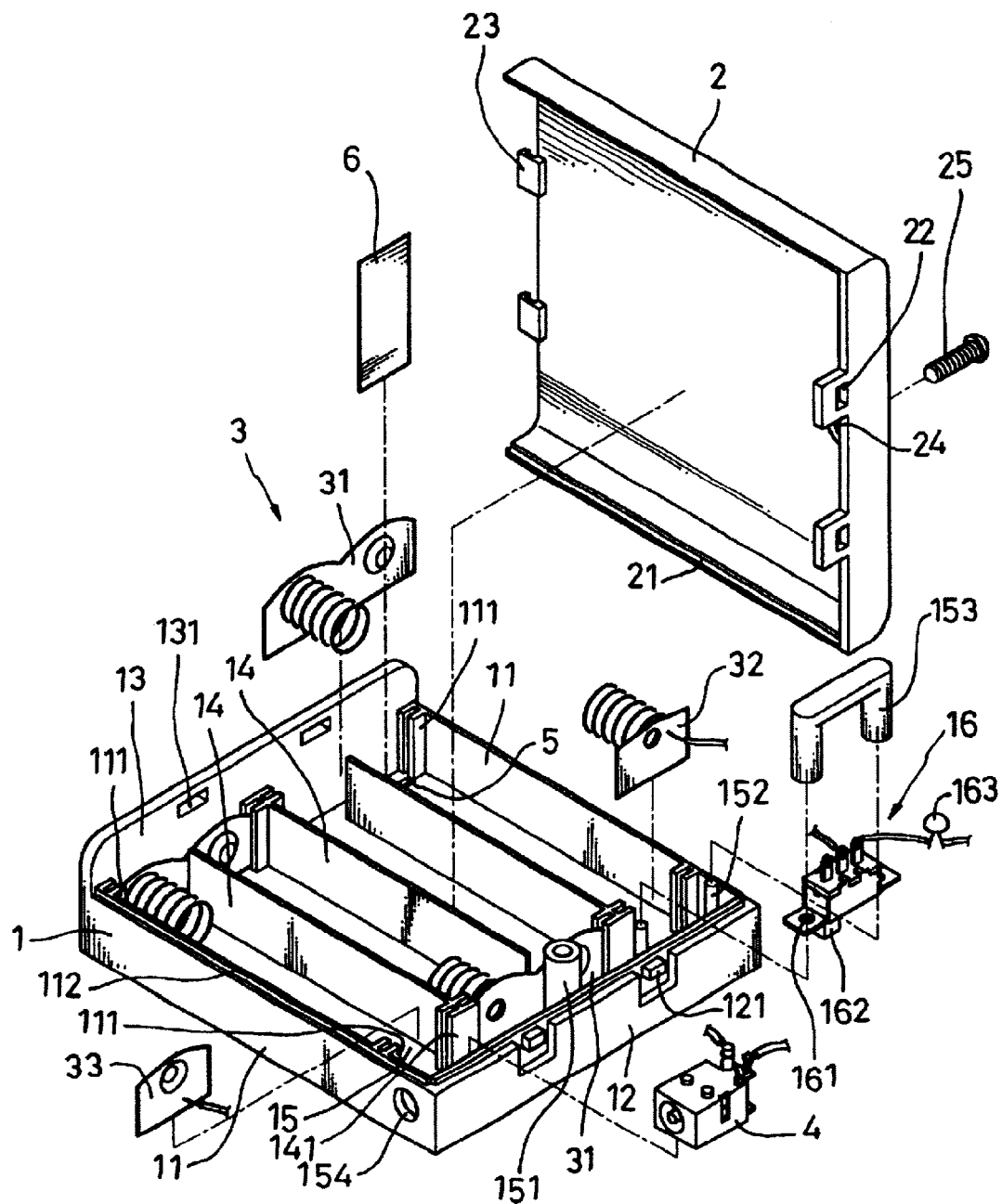
FIG. 1 is an exploded perspective view of a closed type battery case according to the present invention.
Figure 2:
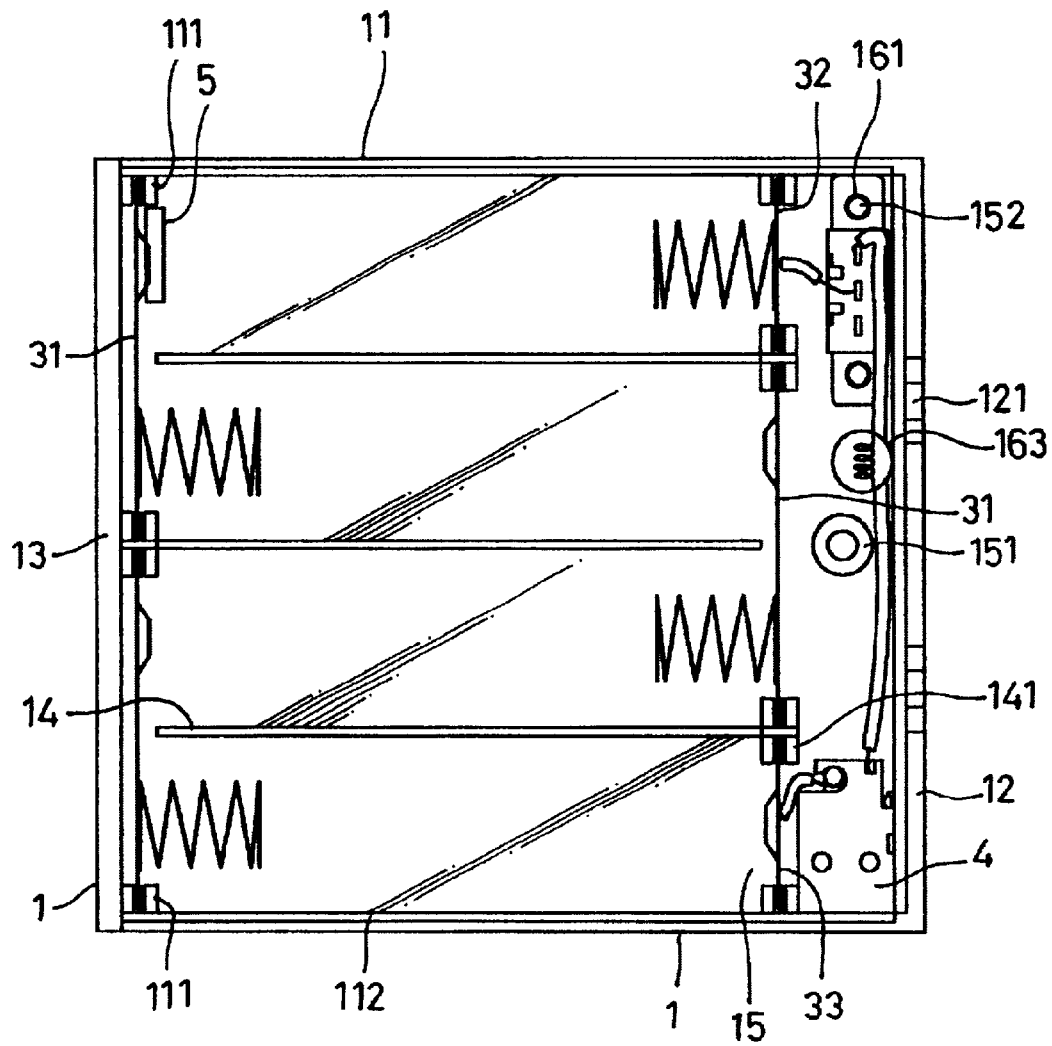
FIG. 2 is a top view of a lower base of the closed type battery case according to present invention.
Figure 3:
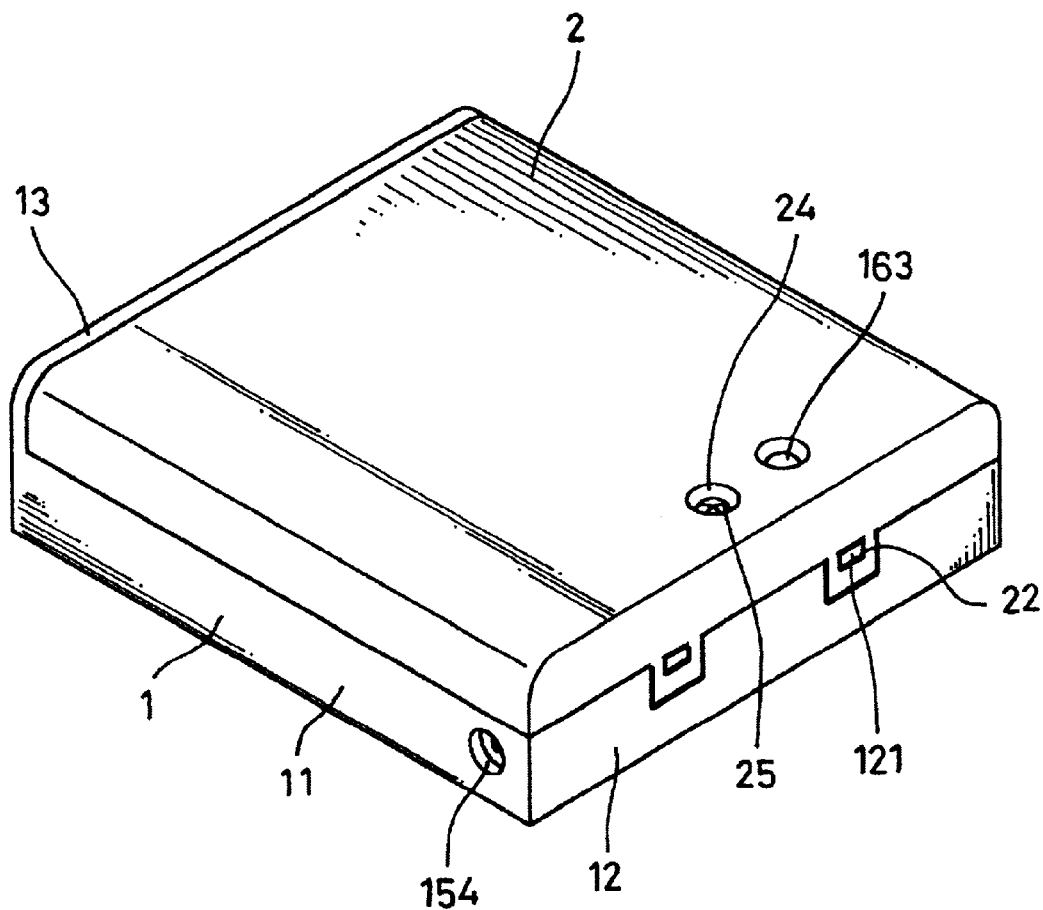
FIG. 3 is a perspective view of the closed type battery case according to the present invention after being assembled.

Referring to FIGS. 1 to 3, a battery case according to the present invention basically comprises a lower base 1, an upper lid 2, a battery plate device 3 and an output terminal 4.

Wherein, the lower base 1 is a semi-closed casing and provides two opposite lateral walls 11, a front wall 12 and a rear wall 13 with end parts of the respective lateral wall 11 connecting with the front and the rear walls 12, 13. At least a separator 14 is disposed in the lower base parallel to the lateral walls 11 in accordance with the amount of the battery being received in the battery case such that the battery can be separated from each other. Besides, in order to arrange the battery plate device 3 in the lower base 1, the lateral walls 11 and the separator 14 at the end parts thereof integrally extend an side grooved locator 111, and an intermediate grooved locator 141 respectively so that the elements of the battery plate device 3 including a positive-negative plate 31, a negative plate 32, and a positive plate 33 can be attached to the side grooved locator 111, and the intermediate grooved locator 141 respectively. Further, the respective lateral wall 11 at the upper edge thereof has a step rim with a base rib 112 to slidably fit with the upper lid 2. The difference of the battery case of the present invention from the conventional one is that a base chamber 15 is disposed between the front wall 12 and the battery plate device 3 with a partition post 151 and two secondary posts 152 therein for the upper lid 2 being fastened to the lower base 1 and a cut over switch 16 being fixedly attached to the lower base 1 through the a key hole 161 thereof. The cut over switch 16 has a push knob 162 extending outward through a base hole of the base casing 1 (The base hole is not shown in FIG. 1 because of the projection angle.) so as to be stirred with hand for controlling the power source in a state of being connected or disconnected. In addition, a U-shaped retainer 153 can engage with the two secondary posts 152 to hold the on-off switch 16. Moreover, the case chamber 15 at a proper position thereof may provide a chamber hole 154 for receiving the output terminal 4 or for the output terminal 4 extending outward. The front wall 12 and the rear wall 13 at least has a lock tenon 121 and a lock hole 131 respectively so as to form an effect of double engagement with the upper lid 2.

The upper lid 2 at two lateral sides thereof provides a respective lid rib 21 corresponding to the base ribs 112 so that the upper lid 2 can slidably fit with the lower base 1. The upper lid 2 at the front end part thereof has at least an engaging opening 22 corresponding to the lock tenon 121 and at the rear side thereof has at least an engaging hook 23 corresponding to the lock hole 131 such that the upper lid 2 can engage with the lower base 2 by way of the lock tenon 121 inserting into the engaging opening 22 and the engaging hook 23 engaging with the lock hole 131. Further, a lid hole 24 provided in the upper lid 2 can align with the partition post 151 as soon as the upper lid 2 covers the lower base 1 so that a screw 25 can be fastened to the partition post 151 through the lid hole 24.

The positive-negative plate 31, the negative plate 32 and the positive plate in the battery plate device 3 at both lateral end parts thereof are inserted into the side locator 111 and the intermediate locator 141 respectively in accordance with the circuit principle so as to form a series circuit for the battery. The switch 16 at a contact end thereof is connected to a pole of the battery plate device 3 and at another contact end thereof is connected to a pole of the output terminal 4 via a lead wire, and another pole of the battery plate device 3 is connected to another pole of the output terminal 4 directly via another lead wire such that the output terminal 4 can provide a function of outputting the power. Further, an indicator light 163 can be arranged between the switch 16 and the output terminal 4.

The output terminal 4 is disposed in the base chamber 15 to connect with an electronic product such as a mobile phone through a chamber hole 154 for offering a temporary power supply. In practice, the output terminal 4 can be a socket as shown in FIG. 1 or a telephone jack so that the power source can be supplied to the electronic product as soon as a corresponding plug is inserted into the socket or the telephone jack.

Furthermore, the lower base 1 or the upper lid 2 at a proper place thereof may be arranged an elongated slot 5 and an insulation card 6 can be inserted into the elongated slot 5 to intervene between the battery plate device 3 and the contact pole of the battery such that the phenomenon with regard to the leakage or the abnormal discharge of electricity can be avoided during the battery case being assembled or delivered. The insulation card 6 can be made of foldable high molecular sheet so as to be adhered to the outer surface of the battery case. While the battery case is in use, the contact pole on the battery can contact with the battery plate device 3 once the insulation card 6 is removed.

It is appreciated from the preceding detailed description that the advantages of the battery case according to the present invention can summarized hereinafter:

(1) It is not possible for the closed battery case of the present invention being penetrated by the liquid. Basically, the battery case of the present invention is well enclosed so that the shortcomings involved in the conventional battery case such as the foreign liquid easily seeping into the battery and the battery easily loosening from the original position thereof can be avoided.

(2) The lower base can be in conjunction with the upper lid firmly by way of the base ribs fitting with the lid ribs, the lock hole being locked by the engaging hook, and the lock tenon inserting into the engaging opening so that it is steady and compact after the battery case of the present invention is fully assembled.

(3) A cut over switch is provided for the closed type battery case of the present invention so that the switch can be operated to control the supply of power source as soon as the switch is stirred with hand to be on or off for securing the stability of power source during use.

(4) The closed type battery case of the present invention can offer a function of temporary power supply. The electronic product can be recharged promptly and keep running as soon as the output terminal is connected to the input end of the electronic product. In addition, the battery adopted in the closed type battery case of the present invention can be obtained easily so that it is convenient in case of the battery being replaced and the user does not have to worry about if the power of the electronic product is out.

(5) Multiple insulations are arranged in the present invention such as the separators in the lower base and the insulation card inserting into the elongated slot to secure the stability. The separator can prevent the battery plates of the battery plate device from contacting each other. The inserted insulation card intervening between the battery and battery plate device can avoid the abnormal discharge.

While the invention has been described with reference to a preferred embodiment thereof, it is to be understood that modifications or variations may be easily made without departing from the spirit of this invention, which is defined by the appended claims.

What is claimed is:

1. The closed battery case, wherein the output terminal is a telephone jack socket.

2. The closed battery case according to claim 1, wherein the output terminal is a telephone jack plug.

3. The closed battery case according to claim 1, wherein an indicator light is disposed electrically connected between the output terminal and the batter plate device.

4. The closed battery case according to claim 3, wherein the cut over switch has two key holes into which two secondary posts in the base chamber are inserted.

5. The closed battery case according to claim 4, wherein the two secondary posts are connected with a U-shaped retainer to secure the cut over switch.

6. The closed battery case according to claim 5, wherein the insulation card is made of a foldable high molecular material and adhered to an outer surface of the battery case.

7. A closed type battery case comprising:
   a) a lower base having:
      i) a front wall having at least one lock tenon;
      ii) a rear wall having at least one lock hole;
      iii) two opposing lateral walls, each lateral wall connected at opposing ends thereof to one end of the front wall and one end of the rear wall, each lateral wall having a base rib on a top edge and an elongated side groove locator at end parts thereof; and
      iv) a plurality of separators positioned within the lower base and parallel to the lateral walls, each of the plurality of separators having an intermediate groove locator at one end thereof; and
      v) a base chamber formed between the front wall and the at least one separator, the base chamber having a chamber hole through one of the lateral walls;
   b) a battery plate device having at least one positive-negative plate, a negative plate, and a positive plate connected to one side groove locator and one intermediate groove locator;
   c) an upper lid having:
      i) a first end having at least one engaging opening, one lock tenon being inserted into each engaging opening;
      ii) a second end having at least one engaging hook, each engaging hook inserted into one lock hole;
      iii) two opposing lateral sides, each lateral side having a lid rib slidably connecting the upper lid to the base rib of the lower base; and
   d) an output terminal positioned within the base chamber and electrically connected to the positive plate and the negative plate, such that an input end of an electronic device is connected to the output terminal through the chamber hole, wherein the output terminal is a telephone jack.

8. The closed type battery case according to claim 7, wherein the upper lid has a lid hole, the lid hole aligns with and is removably connected to a partition post in the lower base by a screw.

9. The closed type battery case according to claim 7, further comprising a cut over switch having a push knob extending through the lower base, the push knob being moveable between an engaged position and a disengaged position, such that the push knob controls a power source.

10. The closed type battery case according to claim 7, further comprising an elongated slot for inserting an insulation card connected to the lower base adjacent to the battery plate device, such that the insulation card is removably positioned between a contact pole of a battery and the battery plate device.

11. The closed type battery case according to claim 7, wherein the plurality of separators include three separators.

12. A closed type battery case comprising:
   a) a lower base having:
      i) a front wall having at least one lock tenon;
      ii) a rear wall having at least one lock hole;
      iii) two opposing lateral walls, each lateral wall connected at opposing ends thereof to one end of the front wall and one end of the rear wall, each lateral wall having a base rib on a top edge and an elongated side groove locator at end parts thereof; and
      iv) a plurality of separators positioned within the lower base and parallel to the lateral walls, each of the plurality of separators having an intermediate groove locator at one end thereof; and
      v) a base chamber formed between the front wall and the at least one separator, the base chamber having a chamber hole through one of the lateral walls;
   b) a battery plate device having at least one positive-negative plate, a negative plate, and a positive plate connected to one side groove locator and one intermediate groove locator;
   c) an upper lid having:
      i) a first end having at least one engaging opening, one lock tenon being inserted into each engaging opening;
      ii) a second end having at least one engaging hook, each engaging hook inserted into one lock hole;
      iii) two opposing lateral sides, each lateral side having a lid rib slidably connecting the upper lid to the base rib of the lower base;
   d) an output terminal positioned within the base chamber and electrically connected to the positive plate and the negative plate, such that an input end of an electronic device is connected to the output terminal through the chamber hole; and,
   e) a cut over switch having a push knob extending through the lower base, the push knob being moveable between an engaged position and a disengaged position, such that the push knob controls a power source, wherein the cut over switch has two key holes into which two secondary posts in the base chamber are inserted.

13. The closed type battery case according to claim 12, wherein the upper lid has a lid hole, the lid hole aligns with and is removably connected to a partition post in the lower base by a screw.

14. The closed type battery case according to claim 12, further comprising an elongated slot for inserting an insulation card connected to the lower base adjacent to the battery plate device, such that the insulation card is removably positioned between a contact pole of a battery and the battery plate device.

15. The closed type battery case according to claim 12, wherein the plurality of separators include three separators.

16. The closed battery case according to claim 12, wherein the two secondary posts are connected with a U-shaped retainer to secure the cut over switch.

* * * * *